United States Patent
Brundridge et al.

(10) Patent No.: US 9,787,539 B2
(45) Date of Patent: Oct. 10, 2017

(54) SYSTEM AND METHOD FOR DISCOVERING A SERVER ON INSERTION INTO A NETWORK

(71) Applicant: Dell Products, LP, Round Rock, TX (US)

(72) Inventors: Michael Brundridge, Georgetown, TX (US); Sudhir V. Shetty, Cedar Park, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 169 days.

(21) Appl. No.: 14/598,639

(22) Filed: Jan. 16, 2015

(65) Prior Publication Data

US 2016/0212027 A1    Jul. 21, 2016

(51) Int. Cl.
*H04L 12/24* (2006.01)
*H04L 12/26* (2006.01)

(52) U.S. Cl.
CPC ...... *H04L 41/0813* (2013.01); *H04L 41/0816* (2013.01); *H04L 41/12* (2013.01); *Y02B 60/43* (2013.01)

(58) Field of Classification Search
CPC ............. H04L 43/0811; H04L 41/0806; H04L 41/0813
USPC ........ 709/221, 222, 223, 224; 370/229, 359, 370/412
See application file for complete search history.

(56) References Cited

U.S. PATENT DOCUMENTS

| | | | |
|---|---|---|---|
| 6,981,174 B1* | 12/2005 | Hanning | G06F 11/2007 714/4.11 |
| 7,187,648 B1* | 3/2007 | Rangarajan | H04L 45/00 370/216 |
| 7,200,865 B1* | 4/2007 | Roscoe | H04L 63/104 726/12 |
| 2002/0002608 A1 | 1/2002 | Aspromonte et al. | |
| 2003/0163582 A1 | 8/2003 | Inoue et al. | |
| 2005/0213563 A1 | 9/2005 | Shaffer et al. | |
| 2008/0005348 A1* | 1/2008 | Kosiba | H04L 29/06027 709/231 |
| 2014/0098810 A1* | 4/2014 | Frey | H04L 49/109 370/359 |

(Continued)

OTHER PUBLICATIONS

"Port Status and Basic Configuration" —Hewlett Packard, Oct. 2005  http://whp-aus1.cold.extweb.hp.com/pub/networking/software/Mgmt-Oct2005-59906023-Chap10.pdf.*

*Primary Examiner* — Randy Scott
(74) *Attorney, Agent, or Firm* — Larson Newman, LLP

(57) ABSTRACT

An information handling system includes a shared network port, and a controller. The shared network port is configured to listen for network traffic during a discovery process in response to the information handling system being inserted into a managed network, and to receive a specific packet that is associated with a managed network. The controller includes a dedicated network port. The controller is configured to communicate with the shared network port, to determine whether the dedicated network port is enabled in response to receiving the specific packet, if the dedicated network port is enabled: to disable the dedicated network port, to enable a shared network port, and to initiate communication over the shared network port; and if the dedicated network port is not enabled: to initiate the communication over the shared network port.

20 Claims, 3 Drawing Sheets

(56) References Cited

U.S. PATENT DOCUMENTS

2015/0117252 A1* 4/2015 Ganesan ............ H04L 41/0813
370/254
2015/0188919 A1* 7/2015 Belton, Jr. .......... H04M 3/2263
726/4

* cited by examiner

SYSTEM AND METHOD FOR DISCOVERING A SERVER ON INSERTION INTO A NETWORK

FIELD OF THE DISCLOSURE

The present disclosure generally relates to a system and method for discovering a server on insertion into a network.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

When a server is inserted into a network, the server can have multiple ports that can utilized to communicate with the other servers and controllers in the network. The server can then determine which port to use while communicating with the network.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
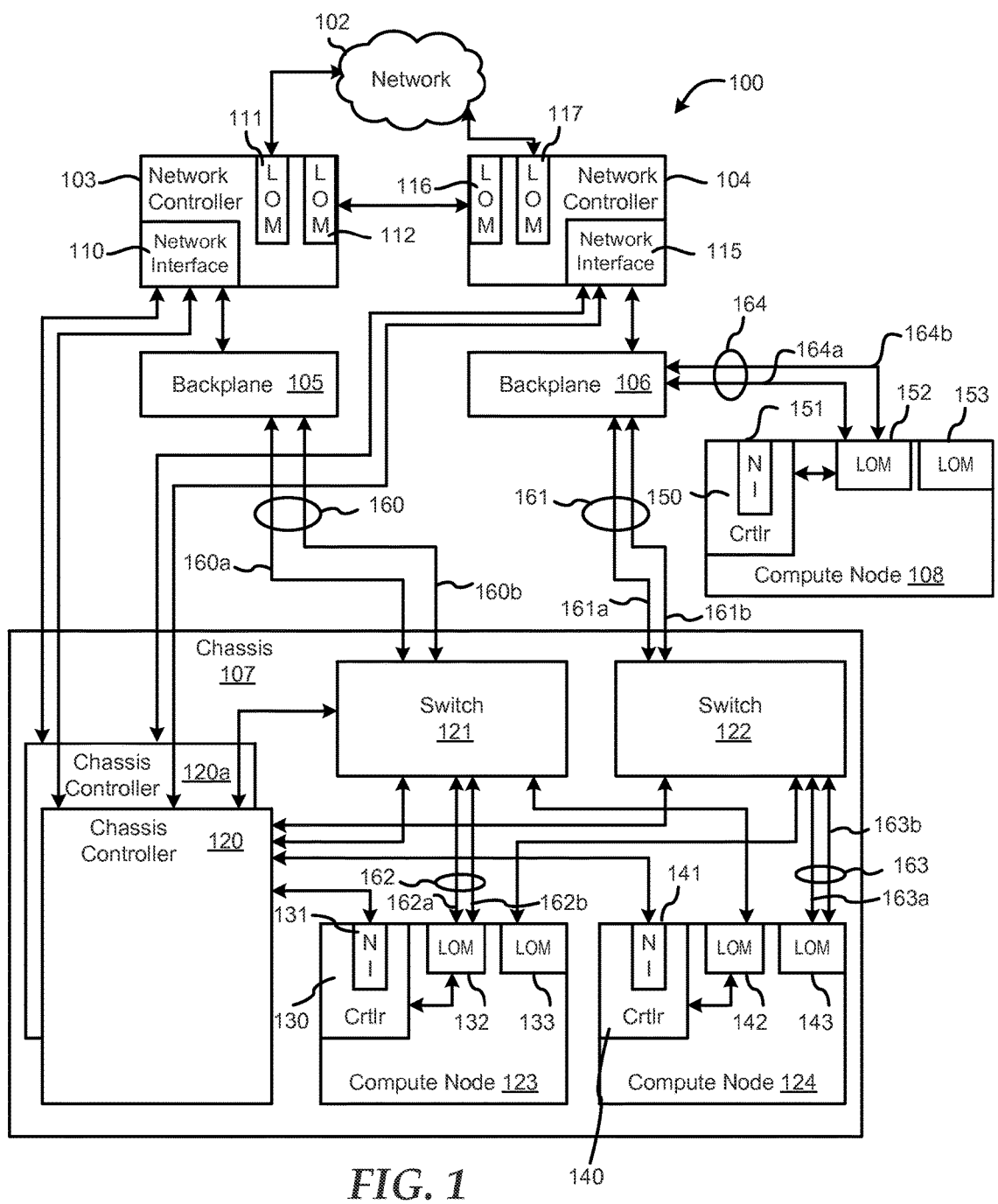
FIG. 1 is a block diagram of an information handling system.

FIG. 1 shows a managed network 100 including multiple information handling systems. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The managed network 100 includes a remaining portion 102 of the network, a first network controller 103, one or more additional network controllers 104, a first backplane 105, one or more additional backplanes 106, a chassis 107, and a compute node 108. The network controller 103 includes one or more network interfaces 110, and local area network (LAN) on motherboard (LOM) ports 111 and 112. In an embodiment, the network interfaces can be peripheral component interconnect express (PCIe) network interface controllers (NCIs), management controllers, or the like. The network controller 104 includes one or more network interfaces 115, and LOM ports 117 and 118. The chassis 107 includes a chassis controller 120, a first switch 121, one or more additional switches 122, a first compute node 123, and one or more additional compute nodes 124. In an embodiment, the chassis 107 can also include a redundant chassis controller 120a that can perform substantially the same operations as the chassis controller 120. Thus, for brevity and clarity, the description of chassis controller 120 and redundant chassis controller 120a will only be discussed with respect to the chassis controller 120.

The compute node 123 includes a controller 130, which in turn includes a network interface 131. The compute node 123 also includes a first LOM 132, and one or more additional LOMs 133. The compute node 124 includes a controller 140, which in turn includes a network interface 141. The compute node 124 also includes a first LOM 142, and one or more additional LOMs 143. The compute node 108 includes a controller 150, which in turn includes a network interface 151. The compute node 108 also includes a first LOM 152, and one or more additional LOMs 153. In an embodiment, the chassis 107, the compute nodes 108, 123, and 124 can each be an information handling system as described above. In an embodiment, the controllers 130, 140, and 150 can be any type of controller to control the respective compute nodes 123, 124, and 108, such as an integrate Dell remote access controller (iDRAC).

In an embodiment, the network controllers 103 and 104 are substantially similar and can perform substantially the same functions. The network controllers 103 and 104 are in communication with the remaining portions 102 of the managed network 100 via their respective LOMs 111 and 117. The network controllers 103 and 104 are also in communication with each other via respective LOMs 112 and 116. The backplane 105 and 106 are in communication with the respective ones of the network controllers 103 and 104 via respective network interfaces 110 and 115 to provide an interface between the network controllers and information handling systems that are inserted/connected to the managed network 100, such as compute nodes 108, 123, and 124. The network controller 104 is also in communication with the chassis 107 via the network interface 100 and 115 of the network controller and the chassis controller 120 and redundant chassis controller 120*a* of the chassis.

The backplane 105 can communicate with chassis 107 via a communication channel 160 between the backplane and the switch 121. Similarly, the backplane 106 can communicate with chassis 107 via a communication channel 161 between the backplane and the switch 122. In an embodiment, the communication channel 160 can provide data via a data path 160*a*, and can provide management information via a management traffic path 160*b*. In an embodiment, the communication channel 161 can provide data via a data path 161*a*, and can provide management information via a management traffic path 161*b*.

The chassis controller 120 can control communications within the chassis 107 via dedicated communication channels between each of the switches 121 and 122, the NIC 131 of the controller 130, and the NIC 141 of controller 140. The switch 121 can communicate with compute node 123 via a communication channel 162 between the switch and the LOM 132. Similarly, the switch 122 can communicate with compute node 124 via a communication channel 163 between the switch and the LOM 142. In an embodiment, the communication channel 162 can provide data via a data path 162*a*, and can provide management information via a management traffic path 162*b*. In an embodiment, the communication channel 163 can provide data via a data path 163*a*, and can provide management information via a management traffic path 163*b*.

The backplane 106 can communicate with compute node 108 via a communication channel 164 between the backplane and the LOM 152. In an embodiment, the communication channel 164 can provide data via a data path 164*a*, and can provide management information via a management traffic path 164*b*. In an embodiment, the NICs 131, 141, and 151 can be dedicated network ports for the respective compute nodes 123, 124, and 108. In an embodiment, the LOMs 132 and 133 can be shared network ports for the compute node 123, the LOMs 142 and 143 can be shared network ports for the compute node 124, and the LOM 152 can be a shared network port for the compute node 108.

In an embodiment, the compute nodes 108, 123, and 124 operate in substantially the same manner, such that communication with network controller 103 or 104 can be handled in a similar fashion by each compute node in response to that compute node being inserted/connected to the managed network 100 via the backplanes 105 and 106. Thus, for brevity and clarity the operation of the compute nodes 108, 123, and 124 upon insertion into the managed network 100 will be described only with respect to compute node 108.

Compute node 108 can include a default configuration that the dedicated network port, NIC 151, is enabled and the shared network port, LOM 152, is disabled. Thus, when the compute node 108 is connected to backplane 106, the default configuration of the compute node initializes communication with the managed network 100 over the NIC 151 of controller 150. In an embodiment, even though the LOM 152 is disabled from being able to provide packets and other signals from the compute node 108 to the backplane 106 and the network controller 104, the LOM is configured to listen for management information via the communication channel 164.

In an embodiment, when the compute node 108 is attached to the backplane 106, a state of a port on the backplane will change to indicate a configuration change within the backplane, such as a new information handling system being attached to the managed network 100. The network controller 104 can detect the state change in the backplane 106 and then provide a specific type of packet to the backplane, which in turn outputs the packet on each of its ports. In an embodiment, the specific type of packet can be a link layer discovery protocol (LLDP) packet with a pre-defined multicast address registered for the network controller 104 to user on a port of the backplane 106. The pre-defined multicast address for the network controller 104 can enable information handling systems, such as compute node 108, that receive the LLDP packet to be able to communicate with the network controller.

The shared network port, LOM 152, of compute node 108 can receive the packet from the backplane 106 via the management traffic path 164*b* of the communication channel 164. The controller 150 can then detect the received packet on the LOM 152. In response to detecting the specific type of packet, the controller 150 can disable the dedicated network port, NIC 151, and enable the shared network port, LOM 152. In an embodiment, the detection of the LLDP packet can be made by the firmware of the controller 150.

Upon the shared network port, LOM 152, being enabled, the controller 150 can utilize Internet Protocol version 6 (IPv6), to perform an auto-configuration of the shared network port and assign a unique IP address to the shared network port. Then controller 150 can then perform a network discovery via the LOM 152. For example, during the network discovery, the controller 150 can provide a multicast domain name system (mDNS) query to discover the network controller 104. In an embodiment, a service advertisement with the mDNS query can include information for the compute node 108, current configurations of the compute node, current behavior of the compute node, and the like. In an embodiment, the current behavior for the compute node 108 can be by the LLDP packet payload, or by a secure network handshake between controller 150 and controller 104, and can configure the compute node as a webserver, a database server, or the like. In an embodiment, the secure network handshake, between controller 150 and controller 104, the controller 150 can provide credentials for the compute node 108 to connect with the managed network 100.

The controller 150 can then wait for a specific amount of time and can determine whether a response has been received from the network controller 104. If the network controller 104 is not located, such that no response is received from the network controller, the controller 150 can determine whether the number of attempts to locate the network controller has exceeded a specific number of attempts. If not, controller makes another mDNS query after a delay of a specific amount of time. However, if the number of attempts has exceeded the specific number, controller 150 can return the compute node to its original configuration. In an embodiment, the original configuration includes the dedicated network port, NIC 151, being enabled, and the shared network port, LOM 152, being disabled.

If the controller 150 receives a response from the network controller 104, the controller can receive data to configure the compute node from the network controller via the data path 164a. For example, the shared network port, LOM 152, can receive a data payload from the network controller on data path 164a, and the LOM can then pass the data payload to the controller. The data payload can cause the controller 150 to change the behavior of the compute node 108 from one configuration to another. For example, the data payload can cause the controller 150 to re-configure the compute node 108 from a webserver to a database server.

Thus, the discovery of configuration of the compute nodes 108, 123, and 124 can be automatically performed in response to the compute nodes being inserted into the managed network 100. The automatic discovery and configuration can result from the network controller 104 providing the specific type of packet to the compute node 108 via the shared network port, LOM 152, while the dedicated network port, NIC 151, is enabled and the LOM is disabled. The reception of the specific type of packet can then cause the controller 150 to complete the discovery and configuration of the compute node 108 in the managed network 100.

Figure 2:
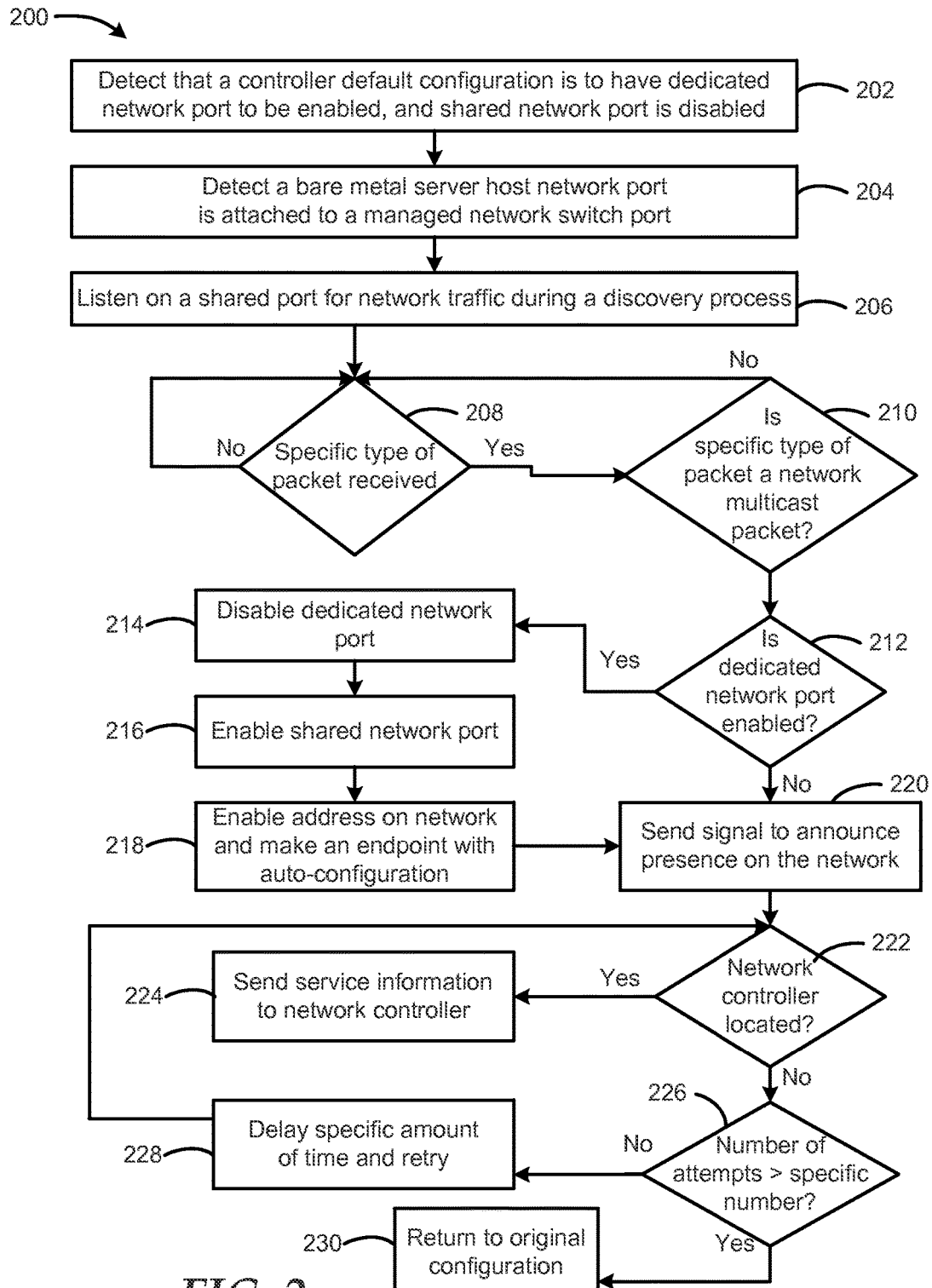
FIG. 2 is a flow diagram of a method for auto-discovery and auto-configuration of an information handling system upon insertion into a managed network.

FIG. 2 shows a flow diagram of a method 200 for auto-discovery and auto-configuration of an information handling system upon insertion into a managed network. At block 202, a default configuration of a controller of a node is detected. In an embodiment, the default configuration includes having a dedicated network port enabled, and a shared network port disable. A detection of a bare metal server host network port being attached to a managed network switch port at block 204. At block 206, network traffic is listened for, at a shared network port of the information handling system, during a discovery process.

At block 208, a determination is made whether a specific type of packet is discovered. In an embodiment, the specific type of the packet is a link layer discovery protocol packet. When the specific type of packet is discovered, the flow continues at block 210 and a determination is made whether the packet is a network multicast packet. If the packet is not a network multicast packet, the flow continues as stated above at block 208. If the packet is a network multicast packet, the flow proceeds to block 212 and a determination is made whether the dedicated network port is enabled.

If the dedicated network port is not enabled, the flow continues at block 220. If the dedicated network port is enabled, the dedicated network port is disabled at block 214. At block 216, the shared network port is enabled. An address on the managed network is enabled for the shared network port, and the information handling system is made an endpoint within the managed network at block 218. In an embodiment, the address on the managed network can be an Internet Protocol address, a media access control address, or the like. In an embodiment, the address is enabled and the information handling system is made an endpoint via an auto-configuration of the information handling system. At block 220, a signal to announce the presence of the information handling system as an endpoint in the network is sent. In an embodiment, the signal to announce the presence of the information handling system can be a low level protocol signal.

At block 222, a determination is made whether a network controller is located. If the network controller is located, service information about the information handling system is sent to the network controller. If the network controller is not located, the flow proceeds to block 226 and a determination is made whether a number of attempts to locate the network controller has exceeded a specific number of attempts. In an embodiment, the attempts to locate the network controller can be through a mDNS query, or the like. If the number of attempts has not exceeded the specific number, the attempt is retried after a delay of a specific amount of time at block 228, and the flow continues as stated above at block 222. If the number of attempts has exceeded the specific number, the information handling system is returned to its original configuration at block 230. In an embodiment, the original configuration includes the dedicated network port being enabled, and the shared network port being disabled.

Figure 3:
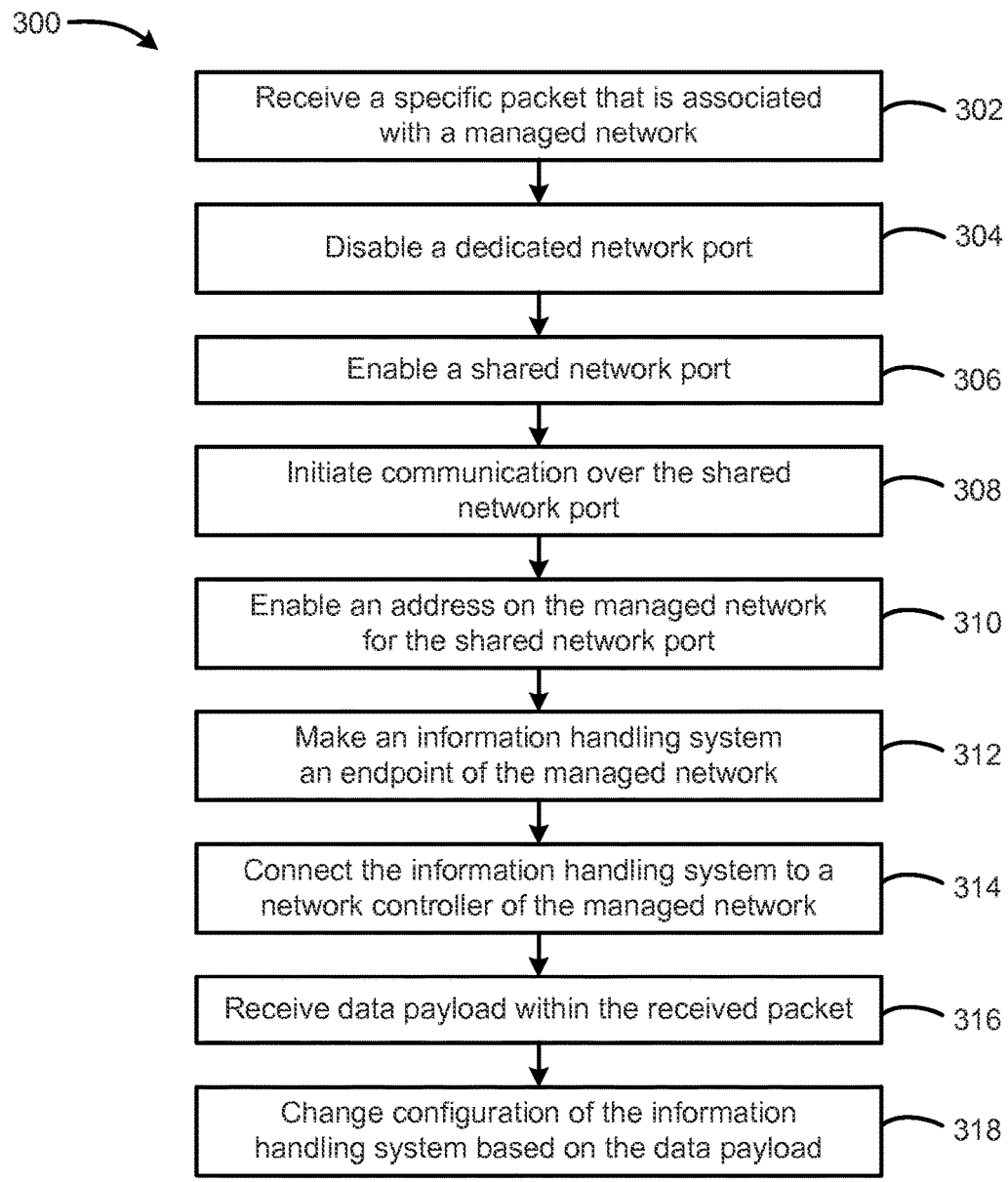
FIG. 3 is a flow diagram of another method for auto-discovery and auto-configuration of an information handling system upon insertion into a managed network.

FIG. 3 shows a flow diagram of another method 300 for auto-discovery and auto-configuration of an information handling system upon insertion into a managed network. At block 302, a specific packet that is associated with a managed network is received at a shared network port of the information handling system. In an embodiment, the specific packet is a link layer discovery protocol packet. A dedicated network port within a controller of the information handling system is disabled in response to receiving the specific packet at block 304. In an embodiment, the controller can be an integrated Dell remote access controller, or similar controller. At block 306, the shared network port is enabled. Communication over the shared network port is initiated at block 308.

At block 310, an address for the shared network port enabled. The information handling system is made an endpoint within the managed network at block 312. At block 314, the information handling system is connected to a network controller of the managed network. A data payload is received in the specific packet at block 316. At block 318, a configuration of the information handling system is changed based on the data payload.

Modifications, additions, or omissions may be made to the information handling system 100 described herein without departing from the scope of the disclosure. For example, information handling systems, such as compute nodes 108, 123, and 124 may include any number of controllers 130, 140, and 150, network ports, processors, memories, disk arrays, or hard disk drives. The components may be integrated or separated. Moreover, the operations may be performed by more, fewer, or other components. Additionally, the operations may be performed using any suitable logic comprising software, hardware, and/or other logic.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a shared network port to listen for network traffic during a discovery process while the shared network port is disabled from providing packets in response to the information handling system being inserted into a managed network, and to receive a specific packet that is associated with the managed network; and
   a hardware controller including a dedicated network port, the hardware controller to communicate with the shared network port, to determine whether the dedicated network port is enabled in response to receiving the specific packet, if the dedicated network port is enabled: to disable the dedicated network port, to enable a shared network port to provide packets, and to initiate communication over the shared network port; and if the dedicated network port is not enabled: to initiate the communication over the shared network port.

2. The information handling system of claim 1, wherein the hardware controller further to determine whether the specific packet is addressed to a pre-defined multicast address prior to determining whether the dedicated network port is enabled.

3. The information handling system of claim 1, wherein the hardware controller further to receive, via the shared network port, credentials for the information handling system to connect to the managed network in response to receiving the specific packet.

4. The information handling system of claim 1, wherein the hardware controller further to enable an address for the shared network port, and to make the information handling system an endpoint within the managed network.

5. The information handling system of claim 1, wherein the controller further to change a configuration of the node from a first configuration to a second configuration based on a data payload of the specific packet.

6. The information handling system of claim 5, the first configuration is to configure the node as a webserver and the second configuration is to configure the node as a database server.

7. The information handling system of claim 1, wherein the specific packet is a link layer discovery protocol packet.

8. A method comprising:
   receiving, at a shared network port of an information handling system, a specific packet that is associated with a managed network while the shared network port is disabled from providing packets;
   determining, at a first controller of the information handling system, whether a dedicated network port is enabled in response to receiving the specific packet;
   if the dedicated network port is enabled:
      disabling the dedicated network port;
      enabling the shared network port to provide packets; and
      initiating communication over the shared network port; and
   if the dedicated network port is not enabled:
      initiating the communication over the shared network port.

9. The method of claim 8 further comprising:
   determining whether the specific packet is addressed to a pre-defined multicast address prior to determining whether the dedicated network port is enabled.

10. The method of claim 8 further comprising:
    receiving credentials for the information handling system to connect to the managed network in response to receiving the specific packet.

11. The method of claim 8 further comprising:
    listening for the specific packet on the shared network port prior to receiving the specific packet.

12. The method of claim 8 further comprising:
    enabling an address for the shared network port; and
    making the information handling system an endpoint within the managed network.

13. The method of claim 8 further comprising:
    changing a configuration of the information handling system from a first configuration to a second configuration based on a data payload of the specific packet.

14. The method of claim 13 wherein the first configuration is to configure the information handling system as a webserver and the second configuration is to configure the information handling system as a database server.

15. The method of claim 8 wherein the specific packet is a link layer discovery protocol packet.

16. A method comprising:
    receiving, at a shared network port of an information handling system, a specific packet that is associated with a managed network while the shared network port is disabled from providing packets, the shared network port to receive a multicast packet;
    disabling, at a first controller of the information handling system, a dedicated network port in response to receiving the specific packet, wherein the dedicated network port is dedicated to receive communication between two particular information handling systems;
    enabling the shared network port to provide packets; and
    initiating communication over the shared network port.

17. The method of claim 16 further comprising:
    enabling an address for the shared network port; and
    making the information handling system an endpoint within the managed network.

18. The method of claim 16 further comprising:
    sending credentials of the information handling system to the managed network in response to receiving the specific packet.

19. The method of claim 16 further comprising:
    receiving a data payload in the specific packet; and
    changing a configuration of the information handling system based on the data payload.

20. The method of claim 16 wherein the specific packet is a link layer discovery protocol packet.

* * * * *